(12) United States Patent
Bauer et al.

(10) Patent No.: US 7,651,181 B2
(45) Date of Patent: Jan. 26, 2010

(54) REFRIGERATOR AND DOOR FOR A REFRIGERATOR

(75) Inventors: Peter Bauer, Munich (DE); Christoph Becke, Grosskarolinenfeld (DE); Alexander Goerz, Aalen (DE); Hans-Reinhart Janssen, Giengen (DE); Ralf Spiller, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 125 days.

(21) Appl. No.: 10/539,541

(22) PCT Filed: Dec. 4, 2003

(86) PCT No.: PCT/EP03/13720

§ 371 (c)(1),
(2), (4) Date: Nov. 14, 2005

(87) PCT Pub. No.: WO2004/057250

PCT Pub. Date: Jul. 8, 2004

(65) Prior Publication Data

US 2006/0108903 A1 May 25, 2006

(30) Foreign Application Priority Data

Dec. 19, 2002 (DE) ................................ 102 59 749

(51) Int. Cl.
*F25D 11/04* (2006.01)
*A47B 96/04* (2006.01)

(52) U.S. Cl. ...................................... 312/405; 312/401

(58) Field of Classification Search ................. 312/404, 312/405.1, 321.5, 400, 401, 405, 326–329, 312/236; 52/784.1, 784.14, 784.15, 784.16
See application file for complete search history.

(56) References Cited

U.S. PATENT DOCUMENTS

| 1,711,381 | A |   | 4/1929  | Gloekler              |
|-----------|---|---|---------|-----------------------|
| 1,961,022 | A | * | 5/1934  | Jacob et al. ... 312/329 |
| 2,102,698 | A | * | 12/1937 | Gould ... 220/592.11   |
| 2,341,924 | A |   | 2/1944  | Kruck                 |
| 2,477,055 | A |   | 7/1949  | Giffard               |
| 2,596,706 | A | * | 5/1952  | McClure ... 312/329    |

(Continued)

FOREIGN PATENT DOCUMENTS

DE 44 04 229 8/1994

(Continued)

OTHER PUBLICATIONS

International Search Report for PCT/EP2003/013720.

*Primary Examiner*—Janet M Wilkens
(74) *Attorney, Agent, or Firm*—James E. Howard; Andre Pallapies

(57) ABSTRACT

A refrigerator door including an outer wall and an inner wall interconnected along longitudinal edges thereof and including a closing element fixed on an upper horizontal edge of the outer and inner walls. The interconnected closing element and the outer and inner walls delimit an insulating inner space therebetween. At the upper edges the outer wall is longer than the inner wall with the closing element bridging the difference in length between the walls. The resulting structure forming a space for a control panel covered by the outer wall when the refrigerator door is closed.

14 Claims, 2 Drawing Sheets

U.S. PATENT DOCUMENTS

| | | | | |
|---|---|---|---|---|
| 2,653,070 A | * | 9/1953 | McClellan | 312/218 |
| 2,750,901 A | * | 6/1956 | McClellan | 109/59 R |
| 2,767,558 A | * | 10/1956 | Wallenbrock et al. | 62/276 |
| 2,810,616 A | * | 10/1957 | McClellan | 312/218 |
| 2,887,965 A | * | 5/1959 | Henkel et al. | 109/59 R |
| 3,314,196 A | | 4/1967 | Betz et al. | |
| 4,122,203 A | * | 10/1978 | Stahl | 428/318.4 |
| 4,198,920 A | * | 4/1980 | Russell | 116/202 |
| 4,667,840 A | * | 5/1987 | Lindsey | 220/3.2 |
| 4,685,402 A | * | 8/1987 | Nelson et al. | 109/65 |
| 5,214,877 A | * | 6/1993 | Kaspar et al. | 49/70 |
| 6,115,240 A | * | 9/2000 | Kaneko | 361/683 |

FOREIGN PATENT DOCUMENTS

| | | | |
|---|---|---|---|
| EP | 1288598 | * | 8/2002 |
| FR | 2653214 | * | 4/1991 |
| GB | 699006 | | 10/1953 |
| JP | 48032348 | | 4/1973 |
| JP | 05026569 | | 2/1993 |
| JP | 5-288459 | * | 11/1993 |
| JP | 08121946 | | 5/1996 |
| JP | 10009761 | | 1/1998 |
| JP | 11351734 | | 12/1999 |
| KR | 2005094674 | * | 9/2005 |

* cited by examiner

REFRIGERATOR AND DOOR FOR A REFRIGERATOR

FIELD OF INVENTION

The present invention relates to a refrigerating appliance, particularly the door thereof.

BACKGROUND

Doors of refrigerating appliances are conventionally constructed from an outer wall, usually a metal sheet, which is cut from a roll to a length corresponding with the height of the door to be produced and is subsequently bent at several places to respectively form the front plate of the door, lateral limbs adjoining longitudinal edges of the front plate and inwardly bent straps adjoining the limbs, and an inner wall, which is formed by deep-drawing from flat plastics material and fastened to the straps of the outer wall. The cavity formed between outer wall and inner wall is closed by an upper closure element and a lower closure element, which are respectively fastened to the transverse edges of inner wall and outer wall, and is filled with an insulating foam material.

FIG. 1 shows a schematic part section through a first example of a conventional refrigerating appliance equipped with such a door. The body 1 of the refrigerating appliance, against which the door 2 abuts, extends upwardly beyond the upper edge of the door, and a control panel 3 is mounted on the body 1 above the door 2. The control panel serves the purpose of accommodating switches, buttons or other operating elements for setting an operational state of the refrigerating appliance, as well as indicating elements giving information about operating parameters of the refrigerating appliance, in a position readily accessible to the user.

In order to be able to satisfy the taste of the widest possible range of buyers it is desirable for the manufacturers of refrigerating appliances to be able to offer refrigerating appliances with different appearances, in which connection a particular significance attaches to the door as the most conspicuous part of the refrigerating appliance. One such possibility of modifying the appearance is to make the door so large that it covers the body of the refrigerating appliance over its entire height inclusive of a possible control field mounted thereat. One conceivable solution of this problem is sketched in FIG. 2. In the case of a known refrigerating appliance, outer wall 4 and inner wall 5 of the door are prolonged up to the height of the upper edge of the body 1 and covered there by a closure element 6. This solution is unsatisfactory for several reasons. Since space is no longer available for the control panel, the control elements either have to be directly mounted at the front edge of the body 1 at the place which in the case of the refrigerating appliance of FIG. 1 has supported the control panel, which is problematic since in this region the inner container 7 and outer wall of the body 1 adjoin one another, or a completely different location for the control elements has to be selected, which obliges extensive constructional changes relative to the refrigerating appliance of FIG. 1 and is correspondingly expensive. In addition, prolongation of the inner wall 5 makes it impossible to produce this by the same deep-drawing tools as the inner wall of the door of FIG. 1, which substantially increases the cost of parallel production of refrigerating appliances according to FIG. 1 and FIG. 2.

FIG. 3 shows another known form of construction of a refrigerating appliance housing in a schematic section analogous to that of FIGS. 1 and 2. This housing is distinguished from that of FIG. 1 in that the control panel 3 is omitted and instead thereof the closure element 6, which connects together the upper transverse edges of outer wall 4 and inner wall 5 of the door 2, is significantly widened so that it is flush with the upper edge of the body 1. This solution has the advantage that it can be realised simply and economically, since body and inner and outer wall of the door can be identical with those of the appliance of FIG. 1 and the differences are substantially limited to the control panel 3 and the closure element 6. However, the wide strip which the widened closure element 6 occupies at the upper edge of the door 2 gives the appliance of FIG. 3 a high degree of similarity to that of FIG. 1.

SUMMARY OF INVENTION

The object of the invention is to create a door for a refrigerating appliance which imparts thereto an appearance differing significantly from that of the appliance of FIG. 1 and which nevertheless can be largely assembled from the same components as the appliance at FIG. 1 or in which the parts inevitably to be changed can be realised economically.

The door according to the invention makes it possible to cover a refrigerating appliance, the body of which corresponds with that of the appliance of FIG. 1, over its entire height by a door with a continuous outer surface. A conspicuous closure such as by, for example, the visible control panel 3 of the appliance of FIG. 1 or the widened closure element 6 of the appliance of FIG. 3 is eliminated. However, the door can be realised very economically, since its inner wall can be identical with that of the appliance of FIG. 1. Manufacture of the outer wall prolonged relative to FIG. 1 requires only a minimum additional expenditure, since it is sufficient to cut off the metal plate, from which the outer wall is formed, at a somewhat changed length, and the steps of bending the metal plate are the same regardless of the length thereof. Moreover, it is even now usual in manufacture to cut to size and process metal plates for the outer wall of the door in different lengths, since refrigerating appliances are in general made in a number of models of different size which differ merely by the height of the door, but not by the width thereof. The first closure element accordingly bridges over, by its shape, the difference in height between door inner wall and door outer wall. The fastening position provided at the door inner wall and the mode of fastening for a door seal can be arranged or constructed analogously to that illustrated in FIG. 1.

Through the invention, appliances with a different appearance, namely with control and/or indicating elements covered or freely accessible when the door is closed, are produced starting out from an appliance housing by the mounting of different doors, in particular a door in which inner wall and outer wall have substantially the same height or a door in which the inner wall is shortened relative to the outer wall.

Preferably, the first closure element has a stepped cross-section with a portion fastened to the transverse edge of the outer wall, a portion fastened to the transverse edge of the inner wall and a flank connecting the portions and compensating for the difference in length of inner wall and outer wall. The free space created by the step-like protrusion allows, in the case of a refrigerating appliance equipped with a door according to the invention, mounting on the body of a control panel which only has to differ slightly from the control panel of FIG. 1 in its depth.

The first closure element can be adapted particularly quickly and economically to various differences in length between inner wall and outer wall if it is provided, in advantageous manner, for the flank to be variably adjustable in its height.

In order to be able to mount a control panel with a vertical front it is desirable for the flank to be parallel to the front side and rear side of the door. Moreover, the height of the flank or the difference in length between outer wall and inner wall should be at least 2 centimetres in order to be able to accommodate a sufficiently large control panel.

A second closure element forming a closure, which is opposite the first closure element, of the intermediate space is preferably fastened in conventional manner to second transverse edges, which are flush with one another, of outer wall and inner wall. This second closure element can thus be identical with a closure element also used for production of a door according to FIG. 1.

BRIEF DESCRIPTION OF THE DRAWINGS

Further features and advantages of the invention are evident from the following description of examples of embodiment with reference to the accompanying figures, in which.

DETAILED DESCRIPTION

Figure 4:
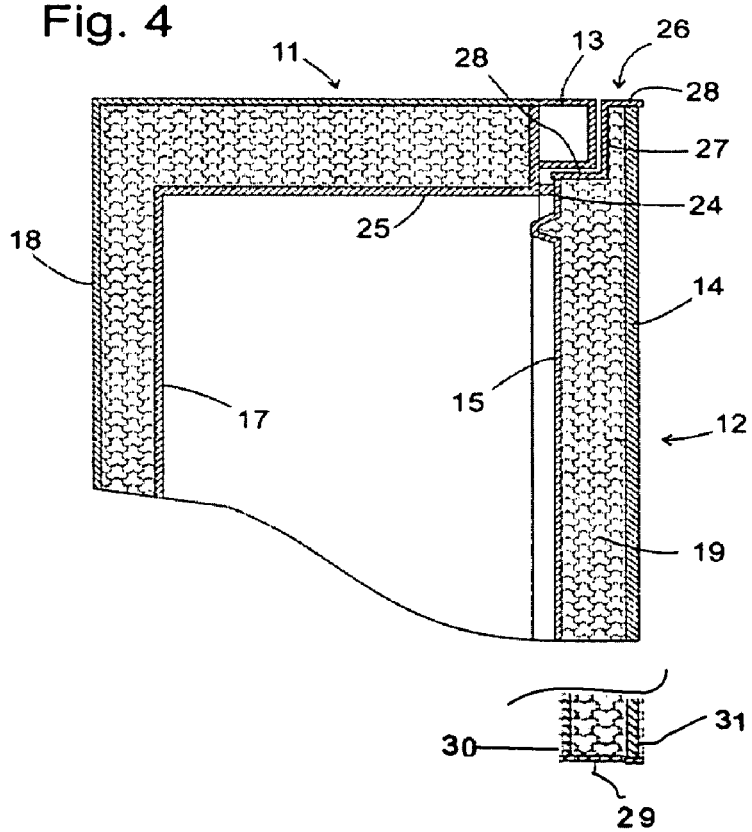
FIG. 4 shows a section through a refrigerating appliance housing according to a first embodiment of the invention.

FIG. 4 shows a vertical section through the upper region of the body 11 and the door 12 of a refrigerating appliance according to the invention. The body has a multilayer construction, which is known per se, with an outer wall 18 of sheet metal and an inner container 17 of plastics material, which bound an intermediate space filled with insulating foam and adjoin in the region of a front side of the body 11 at which also the door abuts. The boundary region between inner container 17 and outer wall 18 is covered along the upper edge of the body 11 by a schematically illustrated control panel 13, formed as a cap portion of plastics material, in which control and indicating elements for influencing or indicating the operational state of the refrigerating appliance (not illustrated) are arranged.

Figure 5:
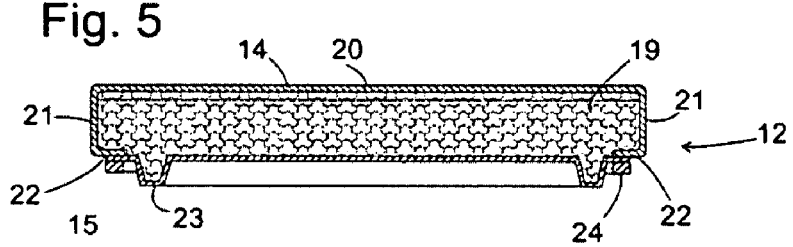
FIG. 5 shows a horizontal section through the door of the refrigerating appliance.

FIG. 5 shows a horizontal section through the door 12 abutting the body 11. An outer wall 14 of sheet metal and an inner wall 15 deep drawn from plastics material bound an intermediate space 19 filled with insulating foam material. The metal sheet is bent several times in longitudinal direction in order to form a front plate 20, two lateral limbs 21 and fastening straps 22, which represent longitudinal edges of the metal sheet, to which the inner wall 15 is fastened. Formed at the inner wall 15 by deep drawing is an encircling frame, the protruding vertical webs 23 of which serve for reinforcing and possibly for the fastening of door stops. An encircling seal 24 extends along the outer edge of the inner wall 15.

As can be seen in FIG. 4, the inner wall 15 extends insignificantly further upwards beyond the ceiling 25 of the inner container 17, as required to enable mounting on the inner wall 15 of the encircling seal 24 which when the door 12 is closed bears against a front edge of the inner container 17 or against bent-over portions of the lateral edges of the outer wall 18. The closed door 12 defines a plane across the access opening to the inner container 17. The outer wall 14 of the door thereagainst extends upwardly beyond the inner wall 15 so that it virtually completely covers the body 11.

Compensation for the difference in height between inner wall 14 and outer wall 15 is provided by a closure element 26 which is injection-moulded from plastics material and which has two horizontal portions 28, which are connected by a vertical flange 27 and of which one is connected with the upper transverse edge of the outer wall 14 and the other with that of the inner wall 15, the closure element embracing the transverse edges in sealing manner relative to the thermal insulation material to be foamed.

For stabilising the fastening of the closure element 26 to the walls of the door the closure element 26 comprises webs or projections (not shown in the figures) which engage in the intermediate space 19 and respectively bear against a rear side of one of the walls 14, 15 and which are glued to the walls 14, 15. Due to the adhesive action of the thermal insulating material the closure elements are connected together with the inner and outer wall to form a structure stiff in shape.

The control panel 13 is fitted in the cut-out bounded by the lower horizontal portion 28 and the flank 27. In the state shown in FIG. 4 the control panel 13 is completely covered by the door 12; when the door is open, it is freely visible and accessible.

Figure 1:
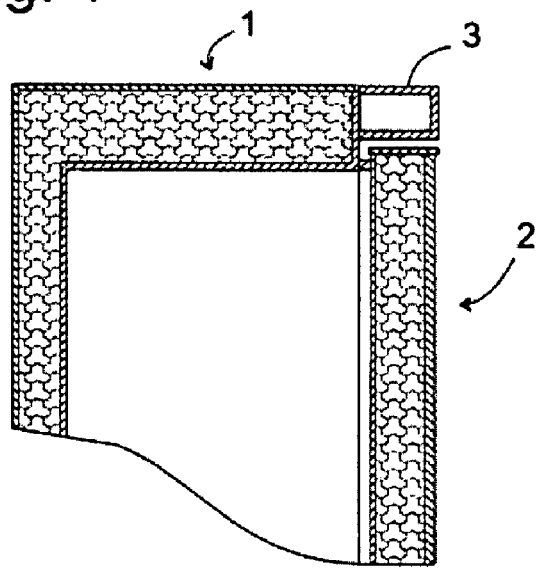
FIG. 1 shows a schematic part section through a conventional refrigerating appliance housing.
Figure 2:
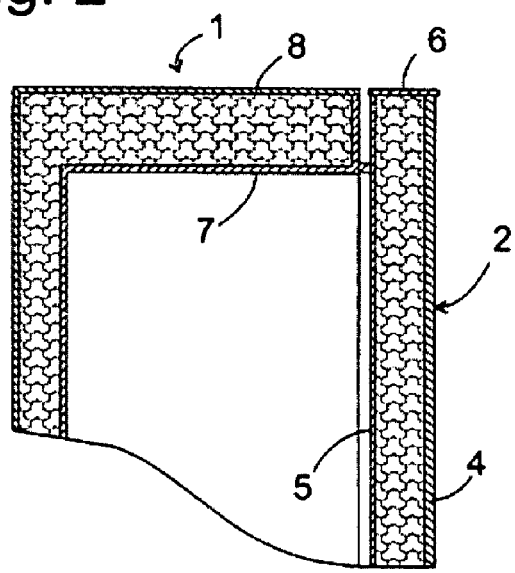
FIG. 2 shows a schematic section through a possible modification of the housing of FIG. 1.
Figure 3:
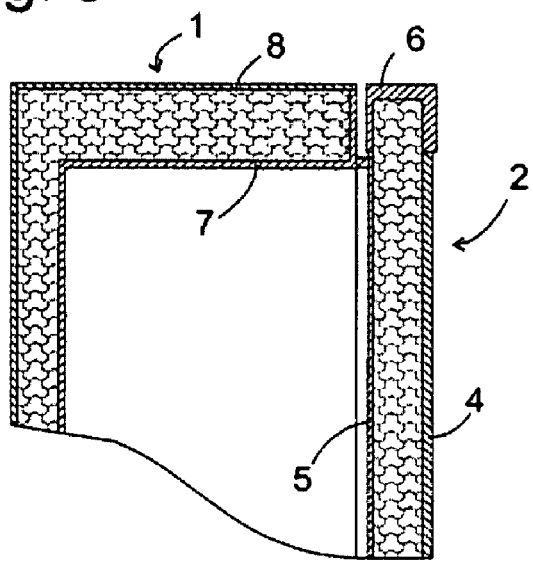
FIG. 3 shows a section through a further conventional housing.

The intermediate space 19 of the door 12 is closed at the lower edge, which is not shown in FIG. 4, by a second closure element 29. Since the edges of the walls 14, 15 are flush at their lower edge, i.e. the second transverse edges 30, 31, of the door 12, this second closure element 29 has the shape of the closure element 6 of FIG. 1. In order to construct the refrigerating appliance shown in FIG. 4, merely three parts differing from the corresponding parts of the refrigerating appliance of FIG. 1 are needed: the control panel, the depth of which is partly reduced in the case of the refrigerating appliance according to the invention, the closure element 26 and the slightly prolonged outer wall 14 of the door. All other parts can be used identically for both types of refrigerating appliance.

Figure 6:
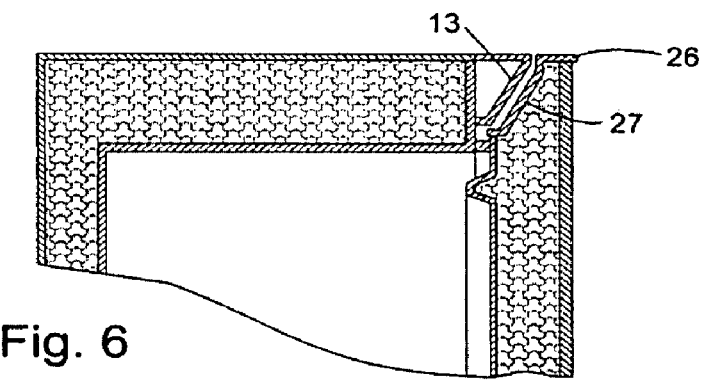
FIG. 6 shows a section through a refrigerating appliance according to a second embodiment of the invention.

FIG. 6 shows a modification of the refrigerating appliance of FIG. 4, which is particularly suitable for appliances with a large constructional height. In the case of this modification the front side of the control panel 13 is not vertical, but angled, so that it can be more conveniently read and used by a user standing in front of it and having to look up at it. The cross-section of the closure element 26 is adapted to the modified control panel in that the flank 27 is also oriented to be at an angle and parallel to the front side of the control panel.

The invention claimed is:

1. A door for a refrigerating appliance, comprising:
   an outer wall and an inner wall connected together along longitudinal edges;
   a first closure element fastened to a transverse edge of said outer wall and a transverse edge of said inner wall, said first closure element together with said outer wall and said inner wall delimiting an insulating intermediate space, said inner wall constructed to be shorter in the longitudinal direction than said outer wall, said first closure element bridging the difference in length between said inner wall and said outer wall;
   a second closure element which is fastened to a second transverse edge of said outer wall and said inner wall, respectively, each of said second transverse edges flush with one another.

2. The door according to claim 1, including said first closure element forms an upper closure of the door.

3. A refrigerating appliance including a door, comprising a body against which the door abuts when said door is in a closed position;
said door including an outer wall and an inner wall connected together along longitudinal edges and defining a door plane when said door is in the closed position;
a first closure element fastened to a transverse edge of said outer wall and a transverse edge of said inner wall, said first closure element together with said outer wall and said inner wall delimits an insulating intermediate space and said first closure element having a stepped cross-section with a first portion fastened to said transverse edge of said outer wall, a second portion fastened to said transverse edge of said inner wall and a flank portion connecting said first and second portions, said flank portion compensating for the difference in length between said inner wall and said outer wall; said inner wall constructed to be shorter in the longitudinal direction than said outer wall, said first closure element bridges the difference in length between said inner wall and said outer wall forming a space between said body and said first closure element; and
at least one of a control arrangement and a condition-indicating panel mounted at said body at the height of said first closure element in said space and formed as an uninsulated cap portion extending outwardly beyond the door plane when the door is in a closed position.

4. The appliance according to claim 3, including said first closure element formed from an injection moulding of a plastics material.

5. The appliance according to claim 3, including said flank portion is substantially parallel to the front side and the rear side of the door.

6. The appliance according to claim 3, wherein a height of said flank portion is adjusted to compensate for the difference in length between said inner wall and said outer wall.

7. The appliance according to claim 3, including the height of said flank portion compensating for the difference in length is at least two (2) centimeters.

8. The appliance according to claim 3, including a second closure element which is fastened to a second transverse edge of said outer wall and said inner wall, said transverse edges flush with one another.

9. The appliance according to claim 8, including said first closure element forms an upper closure of the door.

10. The appliance according to claim 3, including said first closure element forms an upper closure of the door.

11. A refrigerating appliance comprising:
a cooling compartment for retaining therein items that are to be cooled, the cooling compartment including a back wall, an access opening, and a side wall, the side wall having an inner surface, an outer surface, and a cap portion, the cap portion extending between and being connected to each of the inner and outer surfaces of the side wall, the cap portion forming a termination of the side wall as viewed in a depth direction from back wall toward the access opening, the inner surface, the outer surface, and the cap portion together delimiting a volume therebetween in which insulating material is disposed, the outer surface and the care portion together forming a border delimiting the access opening, and the side wall being located at a side of the cooling compartment as viewed in a lateral direction perpendicular to the depth direction from back wall toward the access opening;
an indicia bearing portion, the indicia bearing portion being located outwardly of the cap portion of the side wall of the cooling compartment as viewed in the depth direction from back wall toward the access opening and the indicia bearing portion displaying thereon an indicia;
a door, the door being movable between open and shut positions for respectively permitting access via, and closing off, the access opening of the cooling compartment, the door having a lateral extent in the lateral direction such that the door overlies the indicia on the indicia bearing portion in the closed position of the door and having an inside wall and an outside wall, the inside wall overlying the border of the access opening formed by the outer surface and the care portion of the cooling compartment when the door is in the shut position; and
wherein the cap portion extends beyond the inside wall of the door in the depth direction from the back wall toward the access opening when the door is in a shut position closing off the access opening.

12. The refrigerating appliance according to claim 11, wherein a portion of the indicia bearing portion on which the indicia is displayed has a predetermined profile and a portion of the door that overlies the indicia on the indicia bearing portion in the closed position of the door has a corresponding profile shape.

13. The refrigerating appliance according to claim 11, wherein the lateral extent of the door overlying the indicia on the indicia bearing portion in the closed portion of the door is formed from plastic material.

14. A refrigerating appliance comprising:
a cooling compartment for retaining therein items that are to be cooled, the cooling compartment including a back wall, an access opening, and a side wall, the side wall having an inner surface, an outer surface, and an uninsulated cap portion, the cap portion extending between and being connected to each of the inner and outer surfaces of the side wall, the cap portion forming a termination of the side wall as viewed in a depth direction from back wall toward the access opening, the inner surface, the outer surface, and the side wall being located at a side of the cooling compartment as viewed in a lateral direction perpendicular to the depth direction from back wall toward the access opening;
an indicia bearing portion, the indicia bearing portion being located outwardly of the cap portion of the side wall of the cooling compartment as viewed in the depth direction from back wall toward the access opening and the indicia bearing portion displaying thereon an indicia;
a door, the door being movable between open and shut positions for respectively permitting access via, and closing off, the access opening of the cooling compartment, the door defining a plane extending between the side walls and across the access opening when closing off the access opening and having a lateral extent in the lateral direction such that the door overlies the indicia on the indicia bearing portion in the closed position of the door; and
wherein the cap portion extends beyond the plane extending between the side walls and across the access opening when the door is in a shut position closing off the access opening.

* * * * *